United States Patent
Xu et al.

(10) Patent No.: US 10,372,336 B2
(45) Date of Patent: Aug. 6, 2019

(54) FILE ACCESS METHOD, SYSTEM, AND HOST

(71) Applicant: Huawei Technologies Co., Ltd., Shenzhen (CN)

(72) Inventors: Jun Xu, Hangzhou (CN); Yuangang Wang, Shenzhen (CN); Guanyu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 15/582,283

(22) Filed: Apr. 28, 2017

(65) Prior Publication Data
US 2017/0235499 A1    Aug. 17, 2017

Related U.S. Application Data

(63) Continuation of application No. PCT/CN2014/090018, filed on Oct. 31, 2014.

(51) Int. Cl.
| | | |
|---|---|---|
| *G06F 12/00* | (2006.01) | |
| *G06F 3/06* | (2006.01) | |
| *G06F 17/00* | (2019.01) | |
| *G06F 12/02* | (2006.01) | |
(Continued)

(52) U.S. Cl.
CPC .......... *G06F 3/0608* (2013.01); *G06F 3/061* (2013.01); *G06F 3/067* (2013.01); *G06F 3/0631* (2013.01); *G06F 3/0643* (2013.01); *G06F 3/0644* (2013.01); *G06F 9/5016* (2013.01); *G06F 12/023* (2013.01); *G06F 17/00* (2013.01); *G06F 16/183* (2019.01); *G06F 2212/1044* (2013.01)

(58) Field of Classification Search
CPC .... G06F 3/0608; G06F 3/0631; G06F 3/0643; G06F 3/0644
See application file for complete search history.

(56) References Cited

U.S. PATENT DOCUMENTS

| | | | |
|---|---|---|---|
| 6,823,398 B1 * | 11/2004 | Lee | ........................ G06F 3/0622 707/999.1 |
| 7,456,380 B2 | 11/2008 | McGrarth et al. | |
| 7,711,711 B1 | 5/2010 | Linnell et al. | |
(Continued)

FOREIGN PATENT DOCUMENTS

| | | |
|---|---|---|
| CN | 101187931 A | 5/2008 |
| CN | 101189731 A | 5/2008 |
(Continued)

*Primary Examiner* — Gurtej Bansal
(74) *Attorney, Agent, or Firm* — Slater Matsil, LLP

(57) ABSTRACT

A file access method, a system, and a host are provided. According to the method, after obtaining information about first virtual space of a target file, a host allocates, in local virtual address space of the host, second virtual space to the target file, where the first virtual space is space allocated in global virtual address space by a management node in a distributed storage system to the target file. The host converts, according to a correspondence between the first virtual space and the second virtual space, a second access request of accessing the second virtual space into a first access request, where an address of the first virtual space in the first access request includes device information of a first storage node. Then, the host sends the first access request to a network device to route the first access request to the first storage node.

15 Claims, 4 Drawing Sheets

(51) Int. Cl.
*G06F 9/50* (2006.01)
*G06F 16/182* (2019.01)

(56) References Cited

U.S. PATENT DOCUMENTS

| | | | |
|---|---|---|---|
| 8,880,843 B2 * | 11/2014 | Thomas | G06F 11/2094 711/202 |
| 2003/0061462 A1 | 3/2003 | Fister et al. | |
| 2005/0235005 A1 | 10/2005 | Aono | |
| 2008/0140945 A1 | 6/2008 | Salessi et al. | |
| 2012/0110259 A1 | 5/2012 | Mills et al. | |

FOREIGN PATENT DOCUMENTS

| | | |
|---|---|---|
| CN | 102024020 A | 4/2011 |
| CN | 102136003 A | 7/2011 |
| CN | 103870202 A | 6/2014 |
| JP | H02141863 A | 5/1990 |
| JP | 2005309648 A | 11/2005 |
| JP | 2014500542 A | 1/2014 |

\* cited by examiner

FILE ACCESS METHOD, SYSTEM, AND HOST

CROSS-REFERENCE TO RELATED APPLICATIONS

This application is a continuation of International Application No. PCT/CN2014/090018, filed on Oct. 31, 2014, the disclosure of which is hereby incorporated by reference in its entirety.

TECHNICAL FIELD

The present disclosure relates to the field of storage technologies, and in particular, to a file access method, a system, and a host.

BACKGROUND

A new non-volatile memory (NVM) medium, such as phase change memory (PCM), a resistive random access memory (ReRAM), a magnetic random access memory (MRAM) has read and write characteristics similar to a dynamic random access memory (DRAM), and can be mounted on a memory bus to be accessed. Currently, a storage system based on the non-volatile memory medium is a research focus in the industry.

An existing method for remotely accessing a file system includes using the Network File System (NFS) or the Common Internet File System (CIFS) protocol, and the like. These conventional file access manners are essentially based on remote procedure call (RPC), and are access manners over the Transmission Control Protocol/Internet Protocol (TCP/IP). For an NVM-based storage system, if an existing method for remotely accessing a file system is still used, a kernel TCP/IP protocol stack of a host still needs to process an access request, and consequently access efficiency is relatively low.

SUMMARY

Embodiments of the present disclosure provide a file access method, a system, and a host, so as to improve file access efficiency.

According to a first aspect, a file access method includes obtaining, by a host, information about first virtual space of a to-be-accessed target file. The first virtual space is space allocated in a global virtual address space by the management node of a distributed storage system to the target file. The distributed storage system includes the management node, multiple storage nodes, and a network device. Local virtual address space of each storage node in the distributed storage system corresponds to a part of global virtual address space of the distributed storage system. The method further includes allocating, by the host in the local virtual address space of the host, second virtual space to the target file according to the information about the first virtual space. The method further includes converting, by the host according to a correspondence between the first virtual space and the second virtual space, a second access request of accessing the second virtual space into a first access request of accessing the first virtual space. The first access request includes an address of the first virtual space, and the address of the first virtual space includes device information of a first storage node, and the first storage node is a storage node that is in the multiple storage nodes and that is configured to store the target file; and sending, by the host, the first access request to the network device, so that the network device routes the first access request to the first storage node according to the device information that is of the first storage node and that is in the address of the first virtual space.

With reference to the first aspect, in a first possible implementation manner, the obtaining includes: obtaining, by the host, the information about the first virtual space of the target file from metadata of the target file.

With reference to the first aspect or the first possible implementation manner of the first aspect, in a second possible implementation manner, the information about the first virtual space includes a start address and a size of the first virtual space.

With reference to the second possible implementation manner of the first aspect, in a third possible implementation manner, the allocating includes: allocating, by the host in the local virtual address space of the host, the second virtual space having a same size as the first virtual space to the target file.

With reference to the third possible implementation manner of the first aspect, in a fourth possible implementation manner, the method further includes: establishing, by the host, the following correspondence between the first virtual space and the second virtual space: LVA=(GVA−GVA_start)+LVA_start, where, GVA_start represents the start address of the first virtual space, LVA_start represents a start address of the second virtual space, GVA represents the address of the first virtual space, and LVA represents an address of the second virtual space corresponding to the address of the first virtual space.

With reference to any one of the first aspect or the first to the fourth possible implementation manners of the first aspect, in a fifth possible implementation manner, a bit quantity of the address of the first virtual space is 2N, and N is a bit quantity of an address of local virtual address space of the first storage node, and N most significant bits of the address of the first virtual space include the device information of the first storage node, and N least significant bits of the address of the first virtual space are the address of the local virtual address space that is in the first storage node and that is used to store the target file.

According to a second aspect, a system is provided, including a host and a distributed storage system. The distributed storage system includes a management node, multiple storage nodes, and a network device. Local virtual address space of each storage node in the distributed storage system corresponds to a part of global virtual address space of the distributed storage system. The host comprises a processor, a memory storing a program to be executed by the processor. The program comprises instructions for obtaining information about first virtual space of a to-be-accessed target file. The first virtual space is space allocated in the global virtual address space by the management node to the target file. allocate, in local virtual address space of the host, second virtual space to the target file according to the information about the first virtual space. The program comprises instructions for converting, according to a correspondence between the first virtual space and the second virtual space, a second access request of accessing the second virtual space into a first access request of accessing the first virtual space, where the first access request includes an address of the first virtual space, and the address of the first virtual space includes device information of a first storage node, and the first storage node is a storage node that is in the multiple storage nodes and that is configured to store the target file; and send the first access request to the network device, so that the network device routes the first access request to the first storage node according to the device information that is of the first storage node and that is in the address of the first virtual space.

With reference to the second aspect, in a first possible implementation manner, the host is configured to obtain the information about the first virtual space of the target file from metadata of the target file.

With reference to the second aspect or the first possible implementation manner of the second aspect, in a second possible implementation manner, the information about the first virtual space includes a start address and a size of the first virtual space.

With reference to the second possible implementation manner of the second aspect, in a third possible implementation manner, the host is configured to allocate, in the local virtual address space of the host, the second virtual space having a same size as the first virtual space to the target file.

With reference to the third possible implementation manner of the second aspect, in a fourth possible implementation manner, the host is further configured to establish the following correspondence between the first virtual space and the second virtual space: LVA=(GVA−GVA_start)+LVA_start, where, GVA_start represents the start address of the first virtual space, LVA_start represents a start address of the second virtual space, GVA represents the address of the first virtual space, and LVA represents an address of the second virtual space corresponding to the address of the first virtual space.

With reference to any one of the second aspect or the first to the fourth possible implementation manners of the second aspect, in a fifth possible implementation manner, a bit quantity of the address of the first virtual space is 2N, and N is a bit quantity of an address of local virtual address space of the first storage node, and N most significant bits of the address of the first virtual space include the device information of the first storage node, and N least significant bits of the address of the first virtual space are the address of the local virtual address space that is in the first storage node and that is used to store the target file.

According to a third aspect, a host is provided, including: a processing module, configured to: obtain information about first virtual space of a to-be-accessed target file, where the first virtual space is space allocated in global virtual address space of a distributed storage system by a management node in the distributed storage system to the target file, and local virtual address space of each storage node in the distributed storage system is corresponding to a part of the global virtual address space; allocate, in local virtual address space of the host, second virtual space to the target file according to the information about the first virtual space; and convert, according to a correspondence between the first virtual space and the second virtual space, a second access request of accessing the second virtual space into a first access request of accessing the first virtual space, where the first access request includes an address of the first virtual space, and the address of the first virtual space includes device information of a first storage node, and the first storage node is a storage node that is in multiple storage nodes and that is configured to store the target file; and a sending module, configured to send the first access request to a network device in the distributed storage system, so that the network device routes the first access request to the first storage node according to the device information that is of the first storage node and that is in the address of the first virtual space.

With reference to the third aspect, in a first possible implementation manner, the processing module is configured to obtain the information about the first virtual space of the target file from metadata of the target file.

With reference to the third aspect or the first possible implementation manner of the third aspect, in a second possible implementation manner, the information about the first virtual space includes a start address and a size of the first virtual space.

With reference to the second possible implementation manner of the third aspect, in a third possible implementation manner, the processing module is configured to allocate, in the local virtual address space of the host, the second virtual space having a same size as the first virtual space to the target file.

With reference to the third possible implementation manner of the third aspect, in a fourth possible implementation manner, the processing module is further configured to establish the following correspondence between the first virtual space and the second virtual space: LVA=(GVA−GVA_start)+LVA_start, where, GVA_start represents the start address of the first virtual space, LVA_start represents a start address of the second virtual space, GVA represents the address of the first virtual space, and LVA represents an address of the second virtual space corresponding to the address of the first virtual space.

With reference to any one of the third aspect or the first to the fourth possible implementation manners of the third aspect, in a fifth possible implementation manner, a bit quantity of the address of the first virtual space is 2N, and N is a bit quantity of an address of local virtual address space of the first storage node, and N most significant bits of the address of the first virtual space include the device information of the first storage node, and N least significant bits of the address of the first virtual space are the address of the local virtual address space that is in the first storage node and that is used to store the target file.

According to a fourth aspect, a computer program product is provided, including a computer readable storage medium that stores program code, and an instruction included in the program code is used to execute the method in the foregoing first aspect.

Based on the foregoing technical solutions, according to the file access method, the system, and the host in the embodiments of the present disclosure, when a file in a distributed storage system is accessed, second virtual space is allocated in local virtual address space of a host to the file, and a second access request of accessing the second virtual space is converted into a first access request of accessing first virtual space that is of the file and that is in the distributed storage system, and the first access request is sent to a network. In this way, physical storage space in which the file in the distributed storage system is located may be directly accessed without using a kernel of the host, so that a delay can be reduced and file access efficiency can be improved.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure.

It should be understood that the technical solutions in the embodiments of the present disclosure may be applied to various storage system s, and in particular, to a distributed storage system that is based on a non-volatile storage medium.

It should be further understood that in the embodiments of the present disclosure, the term "virtual address space" may also be expressed as "virtual space", that is, "virtual address space" and "virtual space" have a same meaning. Likewise, "local physical storage space" and "local physical space" have a same meaning.

Figure 1:
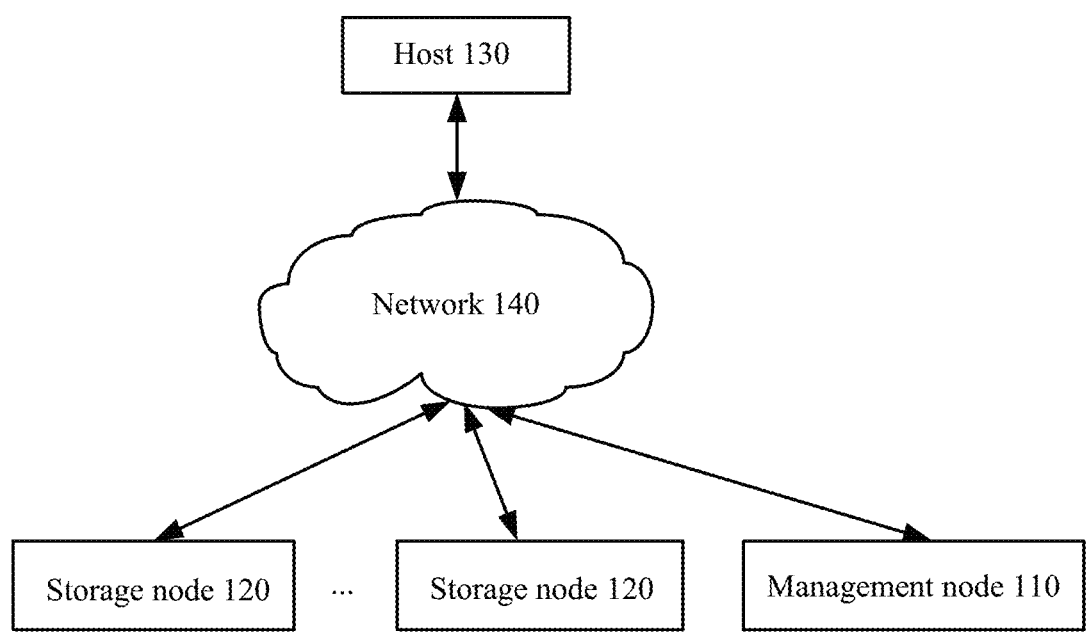
FIG. 1 is a schematic diagram of an application scenario according to an embodiment of the present disclosure.

FIG. 1 is a schematic diagram of an application scenario according to an embodiment of the present disclosure. In FIG. 1, a host 130, a storage node 120, and a management node 110 are interconnected using a network 140. The storage node 120, the management node 110, and the network 140 form a distributed storage system.

The host 130 may be a computer, or may be another user equipment, and the host 130 may communicate with the distributed storage system using the network. The host 130 may include any known computing device in the current technology, such as a server, a desktop computer, and an operating system and another application program are installed in the host 130. There may be multiple host s 130. The host 130 may access a file in the distributed storage system. For example, the host 130 may provide a file access interface for the application program in the host using a file interface module.

The storage node 120 is configured to store file data, and process a file access request. The storage node 120 may include at least one type of non-volatile memory, for example, may include a new NVM with a capability of byte-wise addressing and accessing, such as a PCM, a ReRAM, and an MRAM. In this embodiment of the present disclosure, a file is stored in an NVM memory, and the storage node 120 may access the new NVM using a memory bus.

The management node 110 is configured to manage metadata of a file, and process a search request, an update request, and the like of the host on the metadata of the file. The metadata of the file may include information such as a start address of the file, a size of allocated space, and an actual size of the file. The management node 110 may further be configured to manage global virtual address space of the distributed storage system.

The management node 110 and the storage node 120 may be combined, that is, a node may have functions of both a management node and a storage node.

In this embodiment of the present disclosure, the management node may be independently disposed (for example, the management node 110 in FIG. 1), or may be the node having the functions of both the management node and the storage node. For ease of description, the following uses the management node as an example for description.

A physical layer and a link layer of the network 140 may be based on an Ethernet, a PCIE switch network, an Infini-Band network, an optical network, and the like. The network 140 is configured to route an access request and an access response, and specifically, routing may be performed by a network device (for example, a router or a switch) in the network 140. For ease of description, the following uses the network device as an example for description.

Figure 2:
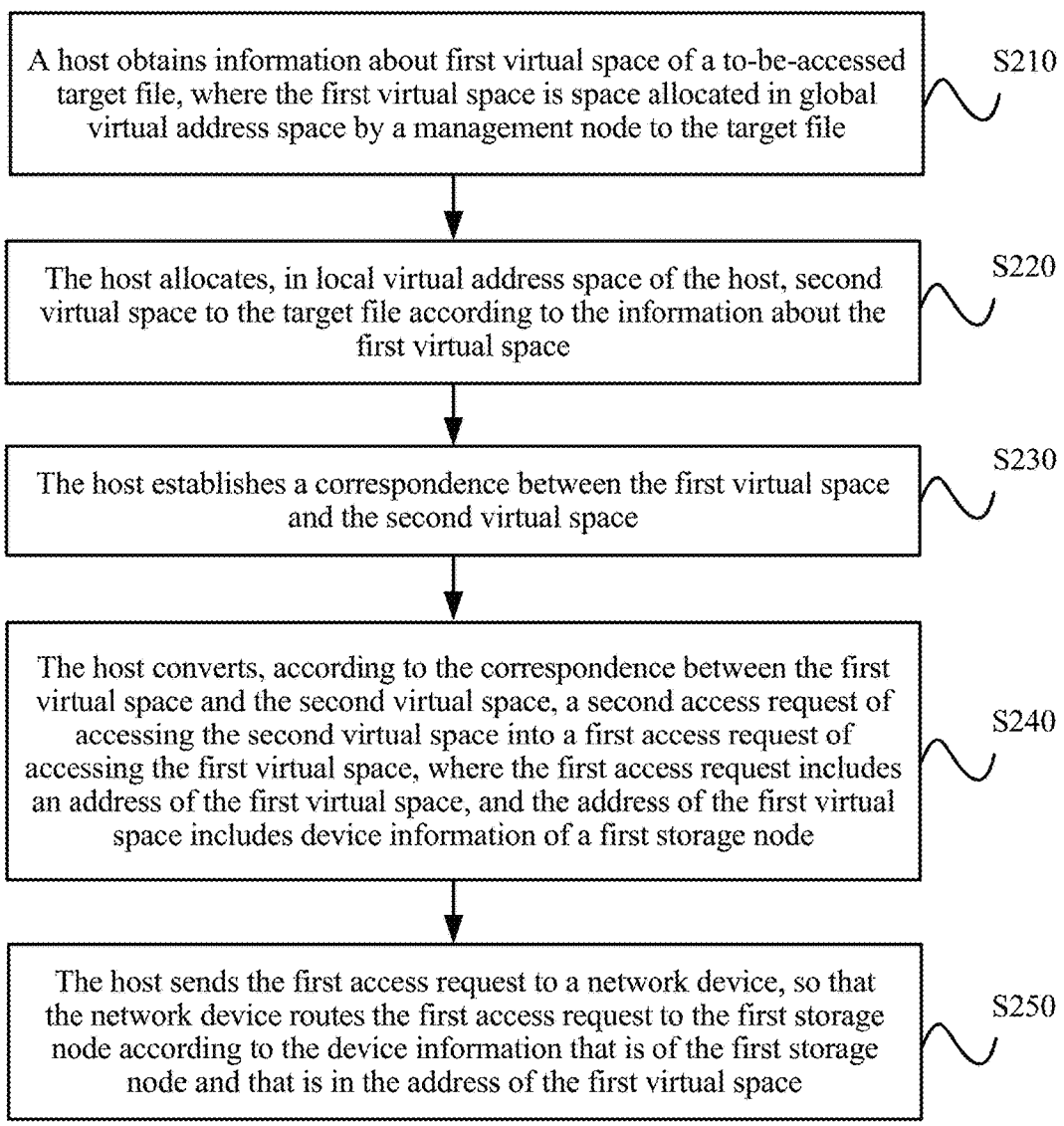
FIG. 2 is a schematic flowchart of a file access method according to an embodiment of the present disclosure.

FIG. 2 shows a schematic flowchart of a file access method 200 according to an embodiment of the present disclosure. The method 200 is applied to a distributed storage system, and the distributed storage system includes a management node, multiple storage nodes, and a network device. Local virtual address space of each storage node in the distributed storage system is corresponding to a part of global virtual address space of the distributed storage system. The method 200 is executed by a host.

S210. The host obtains information about first virtual space of a to-be-accessed target file, where the first virtual space is space allocated in the global virtual address space by the management node to the target file.

The global virtual address space of the distributed storage system is space virtualized for file management in the distributed storage system. Local virtual address space of different storage nodes in the distributed storage system is corresponding to different parts of the global virtual address space of the distributed storage system. For example, space of a first part of the global virtual address space is mapped to local virtual address space of a first storage node in the distributed storage system, and space of a second part of the global virtual address space is mapped to local virtual address space of a second storage node in the distributed storage system. The space of the first part and the space of the second part are different. In this embodiment of the present disclosure, the management node may allocate, in the global virtual address space of the distributed storage system, a section of continuous space (represented as the first virtual space) to the target file. Because the local virtual address space of each storage node in the distributed storage system is corresponding to a part of the global virtual address space of the distributed storage system, the first virtual space may be mapped to the local virtual address space of the storage node based on a correspondence between the global virtual address space and the local virtual address space.

Optionally, as an embodiment of the present disclosure, the information about the first virtual space may include a start address and a size of the first virtual space.

An address of the global virtual address space is a global virtual address. A bit quantity of the global virtual address may be greater than a bit quantity of a local virtual address. An address of the first virtual space includes device information (for example, an ID, or, both an ID and a node type) of the first storage node. The first storage node represents a storage node that is in the multiple storage nodes and that is configured to store the target file. Optionally, a bit quantity of the address of the first virtual space (that is, the bit quantity of the global virtual address) is 2N, and N is a bit quantity of an address of the local virtual address space of the storage node in the distributed storage system (that is, the bit quantity of the local virtual address), and N most significant bits of the address of the first virtual space include the device information of the first storage node, and N least significant bits of the address of the first virtual space are the address of the local virtual address space that is in the first storage node and that is used to store the target file.

The bit quantity of the local virtual address is a bit quantity of an operating system (OS). For example, for a 64-bit OS, a bit quantity of a local virtual address is 64, and a bit quantity of a global virtual address may be 128. In this case, 64 most significant bits of the global virtual address may include device information of a storage node, and 64 least significant bits of the global virtual address may be corresponding to the local virtual address. It should be understood that the device information of the storage node may be carried using only some bits of the 64 most significant bits (for example, 8 most significant bits are an ID of the first storage node), and the remaining bits may be reserved or kept for another purpose.

The information about the first virtual space may include a start global virtual address of the first virtual space and a size of the first virtual space.

Optionally, as an embodiment of the present disclosure, the host may obtain metadata of the target file, and obtain the information about the first virtual space of the target file from the metadata of the target file.

A case of accessing a target file by a host may be creating, opening, and accessing a target file, or may be opening and accessing a created target file. The host may obtain the metadata of the target file from the management node when opening the target file, and obtain the start address and the size of the first virtual space of the target file from the metadata of the target file.

S220. The host allocates, in local virtual address space of the host, second virtual space to the target file according to the information about the first virtual space.

In this embodiment of the present disclosure, optionally, an unused section of virtual address space of an OS may be used as the local virtual address space. For example, a size of virtual address space of the 64-bit OS is $2^{64}$, and in addition to user-mode virtual address space and kernel-mode virtual address space, there is reserved virtual address space, and the reserved virtual address space in the OS may be used as the local virtual address space. Virtual address space of an operating system may also be redivided according to a requirement, to obtain a section of virtual address space to be used as the local virtual address space.

The host allocates, in the local virtual address space, a section of virtual address space (presented as the second virtual space) to the to-be-accessed target file. Optionally, the host allocates, in the local virtual address space of the host, the second virtual space having a same size as the first virtual space to the target file.

S230. The host establishes a correspondence between the first virtual space and the second virtual space.

After allocating the second virtual space to the target file, the host establishes the correspondence between the first virtual space in the global virtual address space and the second virtual space in the virtual address space of the host.

Optionally, as an Embodiment of the present disclosure, the host may establish the following correspondence between the first virtual space and the second virtual space:

$$LVA=(GVA-GVA\_start)+LVA\_start \quad (1)$$

where, GVA_start represents the start address of the first virtual space, LVA_start represents a start address of the second virtual space, GVA represents the address of the first virtual space, and LVA represents an address of the second virtual space corresponding to the address of the first virtual space.

Using a formula (1), a correspondence between the address of the first virtual space GVA and the address of the second virtual space LVA may be established.

It should be understood that another one-to-one correspondence may further be used between the address of the first virtual space GVA and the address of the second virtual space LVA, which is not limited to the correspondence shown in the formula (1). For example, a one-to-one correspondence in which an address of the first virtual space is directly corresponding to an address of the second virtual space may further be used.

S240. The host converts, according to the correspondence between the first virtual space and the second virtual space, a second access request of accessing the second virtual space into a first access request of accessing the first virtual space, where the first access request includes an address of the first virtual space, and the address of the first virtual space includes device information of a first storage node.

The host allocates the second virtual space to the target file, and establishes the correspondence between the first virtual space and the second virtual space. An application in the host accesses the target file by accessing the second virtual space. That is, when the application in the host accesses the target file, the second access request of accessing the second virtual space is generated. For example, the host transmits a file handle pointing at the start address of the second virtual space to the application, and the application accesses the second virtual space using the file handle, and the host generates the second access request.

The host converts, according to the correspondence between the first virtual space and the second virtual space, the second access request into the first access request of accessing the first virtual space. Specifically, the host converts an address of the second virtual space in the second access request into the address of the first virtual space, and generates the first access request. The address of the first virtual space includes the device information (for example, the ID, or both the ID and the node type) of the first storage node. The first storage node is a storage node that is in the multiple storage nodes and that is configured to store the target file.

S250. The host sends the first access request to the network device, so that the network device routes the first access request to the first storage node according to the device information that is of the first storage node and that is in the address of the first virtual space.

The host sends the first access request obtained by means of conversion to the network device, and the network device may route the first access request to the first storage node according to the address of the first virtual space in the first access request. For example, when a bit quantity of the address of first virtual space is 2N, and N most significant bits of the address of first virtual space include the device information of the first storage node, the network device may route the first access request to the first storage node according to the device information that is of the first storage node and that is included in the N most significant bits of the address of the first virtual space.

After receiving the first access request sent by the network device, the first storage node accesses the target file according to the first access request. Specifically, a mapping relationship between the local virtual address space and local physical storage space used to store a file is stored in the first storage node, and the first storage node may determine, according to an address of local virtual address space in a destination address of the access request, an address of local physical storage space used to store the target file. Further, the first storage node may access the local physical storage space according to the determined address of the local physical storage space, so as to access the target file stored in the local physical storage space. In actual application, the first storage node may further send, to the network device, an access response responding to the first access request. The network device sends the access response of the first storage node to the host.

According to the file access method in this embodiment of the present disclosure, physical storage space in which a file in a distributed storage system is located may be directly accessed without a need of using a kernel of a host and without a need of negotiating a directly-accessed address, and therefore, a delay can be reduced and file access efficiency can be improved.

Therefore, according to the file access method in this embodiment of the present disclosure, when a file in a distributed storage system is accessed, second virtual space is allocated in local virtual address space of a host to the file, and a second access request of accessing the second virtual space is converted into a first access request of accessing first virtual space that is of the file and that is in the distributed storage system, and the first access request is sent to a network, In this way, physical storage space in which the file in the distributed storage system is located may be directly accessed without using a kernel of the host, so that a delay can be reduced and file access efficiency can be improved.

Figure 3:
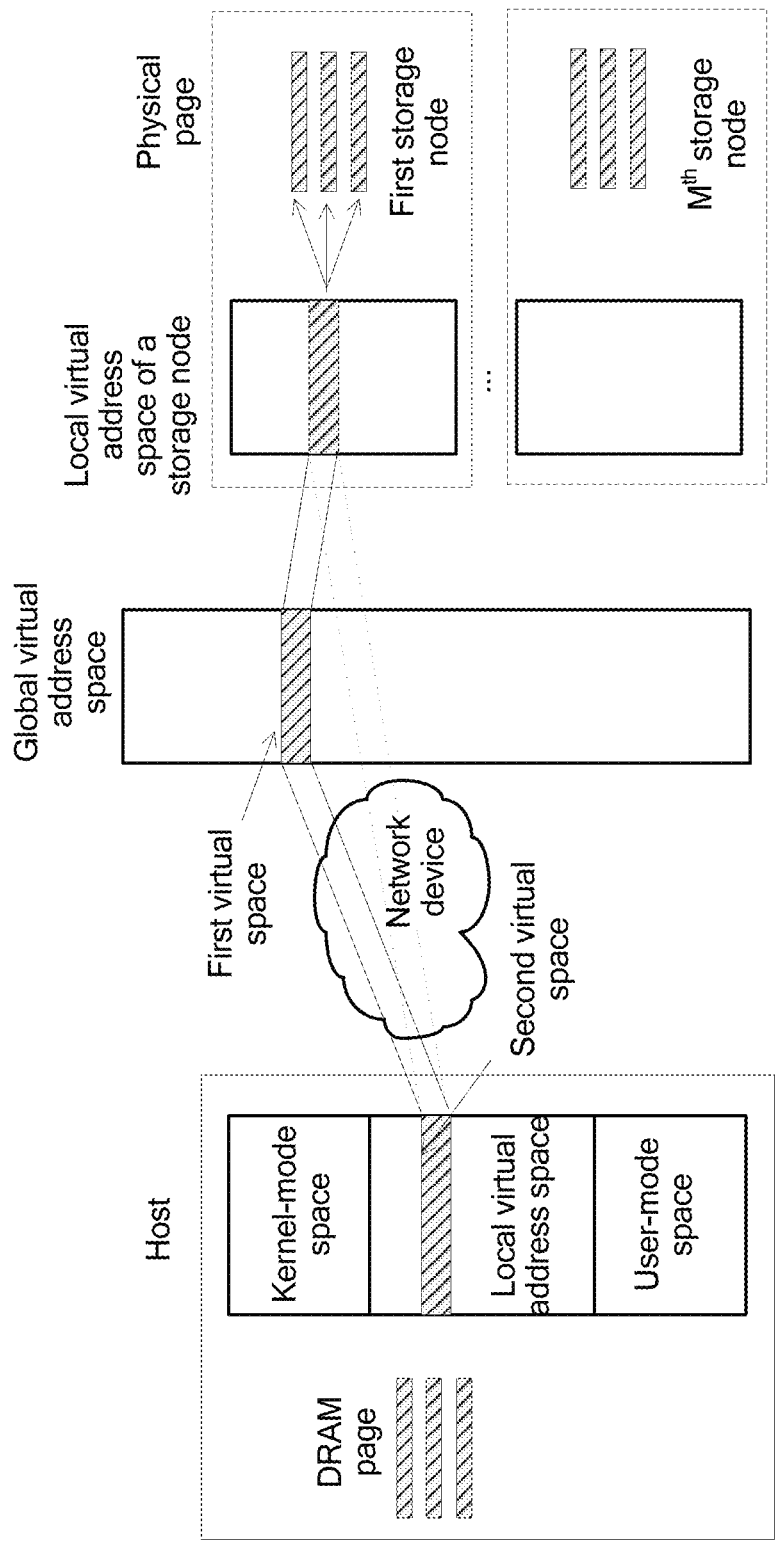
FIG. 3 is a schematic diagram of space of a file according to an embodiment of the present disclosure.

FIG. 3 shows a schematic diagram of space of a file according to an embodiment of the present disclosure. As shown in FIG. 3, there are M storage nodes in total in a distributed storage system. A file in the distributed storage system occupies first virtual space in global virtual address space of the distributed storage system, and the first virtual space is corresponding to a section of local virtual address space of a first storage node, and is mapped to local physical storage space (that is, a physical page, for example, an NVM page) of the first storage node. When opening the file, a host allocates, in local virtual address space of the host, second virtual space to the file, and establishes a correspondence between the first virtual space and the second virtual space, that is, enables the second virtual space to be corresponding to the first virtual space. Therefore, when accessing the local virtual address space (the second virtual space) of the file, the host may generate an access request of accessing global virtual address space (for example, the first virtual space) of the file and send the access request to a network device (for example, a switch based on the global virtual address space), and the network device routes the access request to the first storage node based on a mapping relationship between the global virtual address space and the storage node, so as to access the file in the distributed storage system.

It should be understood that specific examples in the embodiments of the present disclosure are merely intended to help a person skilled in the art better understand the embodiments of the present disclosure, but are not intended to limit the scope of the embodiments of the present disclosure.

It should further be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

The foregoing describes in detail the file access method according to this embodiment of the present disclosure, and the following describes a system and a host according to an embodiment of the present disclosure.

Figure 4:
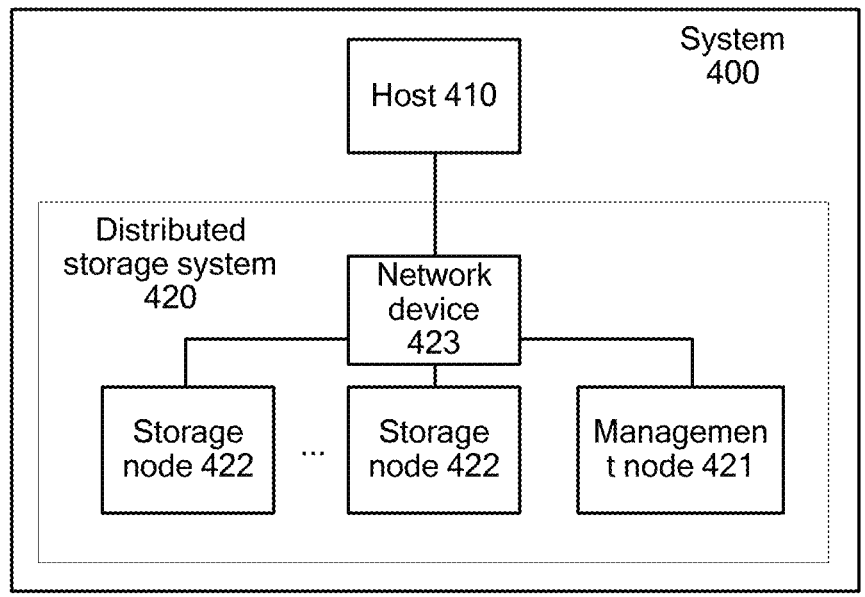
FIG. 4 is a schematic block diagram of a system according to an embodiment of the present disclosure.

FIG. 4 shows a schematic block diagram of a system 400 according to an embodiment of the present disclosure. As shown in FIG. 4, the system 400 includes a host 410 and a distributed storage system 420.

The distributed storage system 420 includes a management node 421, multiple storage nodes 422, and a network device 423.

Local virtual address space of each storage node 422 in the distributed storage system 420 is corresponding to a part of global virtual address space of the distributed storage system 420.

The host 410 is configured to: obtain information about first virtual space of a to-be-accessed target file, where the first virtual space is space allocated in the global virtual address space by the management node 421 to the target file; allocate, in local virtual address space of the host 410, second virtual space to the target file according to the information about the first virtual space; establish a correspondence between the first virtual space and the second virtual space; convert, according to the correspondence between the first virtual space and the second virtual space, a second access request of accessing the second virtual space into a first access request of accessing the first virtual space, where the first access request includes an address of the first virtual space, and the address of the first virtual space includes device information of a first storage node, and the first storage node is a storage node that is in the multiple storage nodes and that is configured to store the target file; and send the first access request to the network device 423, so that the network device 423 routes the first access request to the first storage node according to the device information that is of the first storage node and that is in the address of the first virtual space.

According to the system in this embodiment of the present disclosure, when a file in a distributed storage system is accessed, second virtual space is allocated in local virtual address space of a host to the file, and a second access request of accessing the second virtual space is converted into a first access request of accessing first virtual space that is of the file and that is in the distributed storage system, and the first access request is sent to a network. In this way, physical storage space in which the file in the distributed storage system is located may be directly accessed without using a kernel of the host, so that a delay can be reduced and file access efficiency can be improved.

In this embodiment of the present disclosure, optionally, the host 410 is specifically configured to obtain metadata of the target file, and obtain the information about the first virtual space of the target file from the metadata of the target file.

In this embodiment of the present disclosure, optionally, the information about the first virtual space includes a start address and a size of the first virtual space.

In this embodiment of the present disclosure, optionally, the host 410 is specifically configured to allocate, in the local virtual address space of the host 410, the second virtual space having a same size as the first virtual space to the target file.

In this embodiment of the present disclosure, optionally, the host 410 is specifically configured to establish the following correspondence between the first virtual space and the second virtual space: LVA=(GVA−GVA_start)+LVA_start, where, GVA_start represents the start address of the first virtual space, LVA_start represents a start address of the second virtual space, GVA represents the address of the first virtual space, and LVA represents an address of the second virtual space corresponding to the address of the first virtual space.

In this embodiment of the present disclosure, optionally, a bit quantity of the address of the first virtual space is 2N, and N is a bit quantity of an address of local virtual address space of the first storage node, and N most significant bits of the address of the first virtual space include the device information of the first storage node, and N least significant bits of the address of the first virtual space are the address of the local virtual address space that is in the first storage node and that is used to store the target file.

The host 410 and the distributed storage system 420 in the system 400 according to this embodiment of the present disclosure may be corresponding to the host and the distributed storage system in the foregoing method embodiments, and the host 410 may execute corresponding processes of the foregoing methods. For brevity, details are not described herein again.

Figure 5:
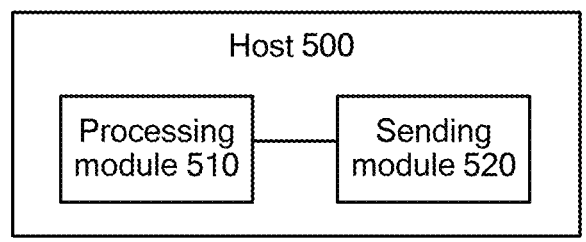
FIG. 5 is a schematic block diagram of a host according to an embodiment of the present disclosure.

FIG. 5 shows a schematic block diagram of a host 500 according to an embodiment of the present disclosure. As shown in FIG. 5, the host 500 includes a processing module 510, configured to: obtain information about first virtual space of a to-be-accessed target file, where the first virtual space is space allocated in global virtual address space of a distributed storage system by a management node in the distributed storage system to the target file, and local virtual address space of each storage node in the distributed storage system is corresponding to a part of the global virtual address space; allocate, in local virtual address space of the host, second virtual space to the target file according to the information about the first virtual space; establish a correspondence between the first virtual space and the second virtual space; and convert, according to the correspondence between the first virtual space and the second virtual space, a second access request of accessing the second virtual space into a first access request of accessing the first virtual space, where the first access request includes an address of the first virtual space, and the address of the first virtual space includes device information of a first storage node, and the first storage node is a storage node that is in multiple storage nodes and that is configured to store the target file. A sending module 520 is configured to send the first access request to a network device in the distributed storage system, so that the network device routes the first access request to the first storage node according to the device information that is of the first storage node and that is in the address of the first virtual space.

According to the host in this embodiment of the present disclosure, when a file in a distributed storage system is accessed, second virtual space is allocated in local virtual address space of a host to the file, and a second access request of accessing the second virtual space is converted into a first access request of accessing first virtual space that is of the file and that is in the distributed storage system, and the first access request is sent to a network. In this way, physical storage space in which the file in the distributed storage system is located may be directly accessed without using a kernel of the host, so that a delay can be reduced and file access efficiency can be improved.

In this embodiment of the present disclosure, optionally, the processing module 510 is specifically configured to obtain metadata of the target file, and obtain the information about the first virtual space of the target file from the metadata of the target file.

In this embodiment of the present disclosure, optionally, the information about the first virtual space includes a start address and a size of the first virtual space.

In this embodiment of the present disclosure, optionally, the processing module 510 is specifically configured to allocate, in the local virtual address space of the host, the second virtual space having a same size as the first virtual space to the target file.

In this embodiment of the present disclosure, optionally, the processing module 510 is specifically configured to establish the following correspondence between the first virtual space and the second virtual space: LVA=(GVA−GVA_start)+LVA_start, where, GVA_start represents the start address of the first virtual space, LVA_start represents a start address of the second virtual space, GVA represents the address of the first virtual space, and LVA represents an address of the second virtual space corresponding to the address of the first virtual space.

In this embodiment of the present disclosure, optionally, a bit quantity of the address of the first virtual space is 2N, and N is a bit quantity of an address of local virtual address space of the first storage node, and N most significant bits of the address of the first virtual space include the device information of the first storage node, and N least significant bits of the address of the first virtual space are the address of the local virtual address space that is in the first storage node and that is used to store the target file.

The host 500 according to this embodiment of the present disclosure may be corresponding to an execution body of the file access method 200 according to an embodiment of the present disclosure, and the foregoing and other operations and/or functions of modules in the host 500 are respectively used to implement corresponding procedures of the foregoing methods. For brevity, details are not described herein again.

Figure 6:
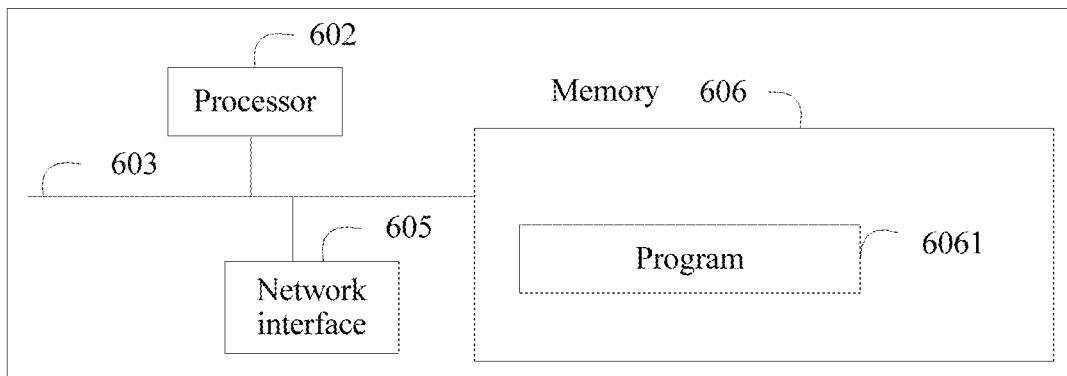
FIG. 6 is a schematic structural diagram of a host according to an embodiment of the present disclosure.

FIG. 6 shows a structure of a host according to another embodiment of the present disclosure. The host includes at least one processor 602 (for example, a CPU), at least one network interface 605 or another communications interface, a memory 606, and at least one communications bus 603. The communications bus 603 is configured to implement connections and communication between these apparatuses. The processor 602 is configured to execute an executable module, for example, a computer program, stored in the memory 606.

The memory 606 may include a high-speed random access memory (RAM), or may further include an NVM, for example, at least one disk memory.

The host implements a communication connection to a network using at least one network interface 605 (which may be wired or wireless).

In some implementation manners, the memory 606 stores a program 6061, and the processor 602 is configured to execute the program 6061 to implement all methods in the foregoing method embodiments.

It should be understood that, the term "and/or" in the embodiments of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc. The foregoing descriptions are merely specific embodiments of the present disclosure, but are not intended to limit the protection scope of the present disclosure.

What is claimed is:

1. A file access method comprises:
    obtaining, by a host, information of a first virtual space of a to-be-accessed target file, wherein the first virtual space is space allocated in a global virtual address space by a management node of a distributed storage system to the to-be-accessed target file, the distributed storage system comprising the management node, multiple storage nodes, and a network device, wherein local virtual address space of each storage node in the distributed storage system is corresponding to a part of the global virtual address space of the distributed storage system;
    allocating, by the host in a local virtual address space of the host, second virtual space to the to-be-accessed target file according to the information of the first virtual space;
    converting, by the host according to a correspondence between the first virtual space and the second virtual space, a second access request of accessing the second virtual space into a first access request of accessing the first virtual space, wherein the first access request comprises an address of the first virtual space, and the address of the first virtual space comprises device information of a first storage node, and the first storage node is a storage node that is in the multiple storage nodes and stores the to-be-accessed target file, and wherein a bit quantity of the address of the first virtual space is 2N, and N is a bit quantity of an address of local virtual address space of the first storage node, and N most significant bits of the address of the first virtual space comprise the device information of the first storage node, and N least significant bits of the address of the first virtual space are the address of the local virtual address space that is in the first storage node and that is used to store the to-be-accessed target file; and
    sending, by the host, the first access request to the network device, causing the network device to route the first access request to the first storage node according to the device information of the first storage node in the address of the first virtual space.

2. The method according to claim 1, wherein obtaining the information of the first virtual space comprises:
    obtaining, by the host, the information of the first virtual space of the to-be-accessed target file from metadata of the to-be-accessed target file.

3. The method according to claim 1, wherein the information of the first virtual space comprises a first start address and a size of the first virtual space.

4. The method according to claim 3, wherein allocating the second virtual space comprises:
    allocating, by the host in the local virtual address space of the host, the second virtual space to the to-be-accessed target file, wherein a second size of the second virtual space equals a first size of the first virtual space.

5. The method according to claim 4, further comprising:
    establishing, by the host, a correspondence between the first virtual space and the second virtual space:

$$LVA=(GVA-GVA\_start)+LVA\_start,$$

wherein GVA_start represents the first start address of the first virtual space, LVA_start represents a second start address of the second virtual space, GVA represents the address of the first virtual space, and LVA represents a corresponding address of the second virtual space corresponding to the address of the first virtual space.

6. A system comprising:
a distributed storage system comprising a management node, multiple storage nodes, and a network device, wherein local virtual address space of each storage node in the distributed storage system is corresponding to a part of a global virtual address space of the distributed storage system; and
a host comprising a processor, a memory storing a program to be executed by the processor, the program comprising instructions for:
obtaining information of a first virtual space of a to-be-accessed target file, wherein the first virtual space is space allocated in the global virtual address space by the management node to the to-be-accessed target file;
allocating, in a local virtual address space of the host, second virtual space to the to-be-accessed target file according to the information of the first virtual space;
converting, according to a correspondence between the first virtual space and the second virtual space, a second access request of accessing the second virtual space into a first access request of accessing the first virtual space, wherein the first access request comprises an address of the first virtual space, and the address of the first virtual space comprises device information of a first storage node, and the first storage node is a storage node that is in the multiple storage nodes and stores the to-be-accessed target file, and wherein a bit quantity of the address of the first virtual space is 2N, and N is a bit quantity of an address of local virtual address space of the first storage node, and N most significant bits of the address of the first virtual space comprise the device information of the first storage node, and N least significant bits of the address of the first virtual space are the address of the local virtual address space that is in the first storage node and that is used to store the to-be-accessed target file; and
sending the first access request to the network device, causing the network device to route the first access request to the first storage node according to the device information of the first storage node in the address of the first virtual space.

7. The system according to claim 6, wherein the program comprises further instructions for:
obtaining the information about of the first virtual space of the to-be-accessed target file from metadata of the to-be-accessed target file.

8. The system according to claim 6, wherein the information of the first virtual space comprises a first start address and a size of the first virtual space.

9. The system according to claim 8, wherein the program comprises further instructions for:
allocating, in the local virtual address space of the host, the second virtual space having a same size as the first virtual space to the to-be-accessed target file.

10. The system according to claim 9, wherein the program comprises further instructions for:
establishing a correspondence between the first virtual space and the second virtual space:

$$LVA = (GVA - GVA\_start) + LVA\_start,$$

wherein GVA_start represents the first start address of the first virtual space, LVA_start represents a second start address of the second virtual space, GVA represents the address of the first virtual space, and LVA represents a corresponding address of the second virtual space corresponding to the address of the first virtual space.

11. A host comprising:
a processor;
a memory storing a program to be executed by the processor, the program comprising instructions for:
obtaining information of a first virtual space of a to-be-accessed target file, wherein the first virtual space is space allocated in a global virtual address space of a distributed storage system by a management node in the distributed storage system to the to-be-accessed target file, and local virtual address space of each storage node in the distributed storage system is corresponding to a part of the global virtual address space;
allocating, in a local virtual address space of the host, second virtual space to the to-be-accessed target file according to the information of the first virtual space; and
converting, according to a correspondence between the first virtual space and the second virtual space, a second access request of accessing the second virtual space into a first access request of accessing the first virtual space, wherein the first access request comprises an address of the first virtual space, the address of the first virtual space comprises device information of a first storage node, and the first storage node is a storage node that is in multiple storage nodes and stores the to-be-accessed target file, and wherein a bit quantity of the address of the first virtual space is 2N, and N is a bit quantity of an address of local virtual address space of the first storage node, and N most significant bits of the address of the first virtual space comprise the device information of the first storage node, and N least significant bits of the address of the first virtual space are the address of the local virtual address space that is in the first storage node and that is used to store the to-be-accessed target file; and
a network interface, coupled to the processor and configured to send the first access request to a network device in the distributed storage system, wherein the network device routes the first access request to the first storage node according to the device information of the first storage node in the address of the first virtual space.

12. The host according to claim 11, wherein the program comprises further instructions for:
obtaining the information of the first virtual space of the to-be-accessed target file from metadata of the to-be-accessed target file.

13. The host according to claim 11, wherein the information of the first virtual space comprises a first start address and a size of the first virtual space.

14. The host according to claim 13, wherein the program comprises further instructions for:
allocating, in the local virtual address space of the host, the second virtual space having a same size as the first virtual space to the to-be-accessed target file.

15. The host according to claim 14, wherein the program comprises further instructions for:
establishing a correspondence between the first virtual space and the second virtual space:

$$LVA = (GVA - GVA\_start) + LVA\_start,$$

wherein GVA_start represents the first start address of the first virtual space, LVA_start represents a second start address of the second virtual space, GVA represents the address of the first virtual space, and LVA represents a corresponding address of the second virtual space corresponding to the address of the first virtual space.

* * * * *